United States Patent
Takahashi et al.

[11] Patent Number: 5,526,242
[45] Date of Patent: Jun. 11, 1996

[54] VEHICLE CORNERING LAMP SYSTEM

[75] Inventors: Kazuki Takahashi; Takayuki Unno, both of Shizuoka, Japan

[73] Assignee: Koito Manufacturing Co., Ltd., Tokyo, Japan

[21] Appl. No.: 363,891

[22] Filed: Dec. 27, 1994

[30] Foreign Application Priority Data

Dec. 28, 1993 [JP] Japan .................................. 5-349260

[51] Int. Cl.$^6$ .................................................. B60Q 1/12
[52] U.S. Cl. .......................... 362/83.3; 362/36; 362/37; 362/41; 315/81; 307/10.8; 307/10.1
[58] Field of Search ..................... 315/79, 81, 82, 315/83, 80; 362/71, 66, 285, 287, 37, 43, 83.3, 40, 41, 36; 307/10.8, 10.1

[56] References Cited

U.S. PATENT DOCUMENTS

| | | | |
|---|---|---|---|
| 4,858,080 | 8/1989 | Oikawa | 362/71 X |
| 4,868,720 | 9/1989 | Miyauchi et al. | 362/71 X |
| 4,870,545 | 9/1989 | Hatanaka et al. | 315/82 X |
| 4,908,560 | 3/1990 | Shibata et al. | 362/71 X |
| 5,404,278 | 4/1995 | Shibata et al. | 362/83.3 X |

*Primary Examiner*—Denise L. Gromada
*Assistant Examiner*—Thomas M. Sember
*Attorney, Agent, or Firm*—Fitzpatrick, Cella, Harper & Scinto

[57] ABSTRACT

A vehicle cornering headlamp system which can be applied to any type of vehicle without changing the correspondence to a radiation angle, and which enables the radiation angle to follow the return of driver's eyes when the vehicle exits a curved road. The angular velocity $\omega_{new}$ is calculated at the time of travelling on a curved road on the basis of the output from an angular velocity sensor and the vehicle speed v is measured on the basis of distance pulses from a distance sensor. The current angular velocity, $\omega_{new}$, is divided by the vehicle speed v to calculate the reciprocal number of a revolution radius r, which is multiplied by a constant K, so as to obtain a target value θs of the radiation angle. Then, on the basis of the difference between $\omega_{old}$, the angular velocity detected at a previous time, and $\omega_{new}$, it is determined that the vehicle is approaching an end of the curved road when the gradient of the angular velocity ω changes toward the direction of zero. If an end of the curved road is detected, a target value θs is set to half the target value θs set when the vehicle is travelling on a curved road.

2 Claims, 6 Drawing Sheets

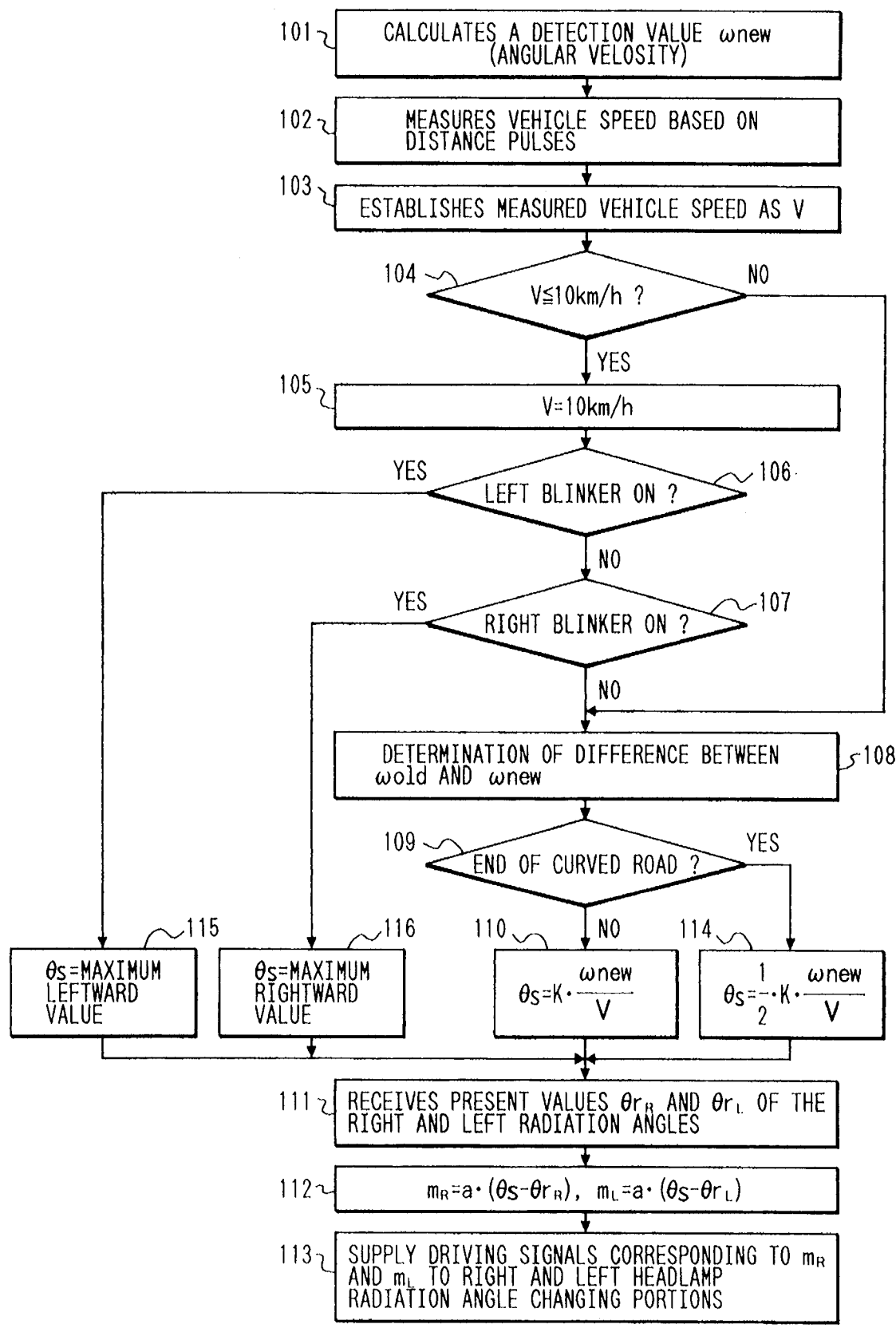

VEHICLE CORNERING LAMP SYSTEM

BACKGROUND OF THE INVENTION

1. Field of the Invention

The present invention relates generally to a vehicle cornering lamp system for changing the radiation angle of a lighting means when travelling on a curved road, and more particularly, to a cornering lamp for use in passenger automobiles.

2. Related Background Art

A vehicle, for example a car, has headlamps in its front right and left sides in order to radiate light forward when necessary (for example, at night). These headlamps fixedly radiate only the area in front of the car. Accordingly, the headlamps cannot radiate light in the direction the car is travelling when the car approaches a curved road. That is, in cornering, such as when turning around a curve, the headlamps cannot direct enough light in the travelling direction in which the car will go, causing drivers to fear the occurrence of a dangerous situation.

In order to improve such a problem, recently, a cornering lamp system (steering interlocking lamp system) has been proposed, which is designed to change the radiation direction (radiation angle) of headlamps correspondingly to the rotation angle of a steering wheel or the driving angle of front wheels, to radiate light in the travelling direction.

However, according to such a steering interlocking lamp system, when changing the radiation angle of headlamps in accordance with the rotation angle of a steering wheel, there is a problem that the correspondence between the rotation angle of the steering wheel and the radiation angle of the headlamps must be varied in accordance with the type of vehicle, since the gear ratio of a steering wheel varies in accordance with the type of vehicle involved. In addition, in the case where the radiation angle of the headlamps is varied in accordance with the driving angle of the front wheels, there is a problem in that the correspondence between the driving angle of front wheels and the radiation angle of the headlamps must be changed in accordance with the type of vehicle, since a wheel base also varies in accordance with the type of vehicle.

Therefore, the present inventors recently proposed a vehicle cornering lamp system in Japanese Patent Unexamined Publication No. Hei-5-80274. According to that cornering lamp system, the target position of a radiation angle of headlamps is obtained based on the vehicle speed and the rotational angular velocity (or the transverse acceleration). The current position of the radiation angle is controlled to coincide with the obtained target position. Accordingly, there is an advantage that the same structure of the system can be applied to any type of vehicle without adjusting the correspondence to the radiation angle.

However, in the aforementioned vehicle cornering lamp system proposed by the inventors in Hei-5-80274, it was determined during experimental testing that the radiation angle could not be changed quickly enough to adequately follow the rapid return of driver's eyes to a straight road when the vehicle exited a curved road.

SUMMARY OF THE INVENTION

The present invention has been made to solve such problems, and provides a vehicle cornering lamp system in which a common system structure can be applied to any type of vehicle, without changing the correspondence to a radiation angle, and which can follow the rapid return of driver's eyes when the vehicle exits a curved road.

In order to attain the foregoing objects, a first preferred embodiment provides angular velocity detecting means for detecting a rotational angular velocity at the time of travelling on a curved road; vehicle speed detecting means for detecting a vehicle speed; target position operating means for obtaining a target position of a radiation angle of the lighting means on the basis of the vehicle speed detected by the vehicle speed detecting means and the rotation angular velocity detected by the angular velocity detecting means; radiation angle control means for controlling a present position of the radiation angle of the lighting means so as to coincide with the target position obtained by the target position operating means; curved road end detecting means for detecting an end of the curved road on the basis of a difference between detection values of the rotational angular velocity, respectively detected at the current time and at a previous time, by the angular velocity detecting means; and target position changing means for changing the target position of the radiation angle obtained by the target position operating means so that the target position is decreased at a predetermined rate in a direction so as to change as the steering wheel us returned to a neutral position when an end of the curved road is detected by the curved road end detecting means.

In addition, a second preferred embodiment includes acceleration detecting means for detecting a transverse acceleration at the time of travelling on a curved road; vehicle speed detecting means for detecting a vehicle speed; target position operating means for obtaining a target position of a radiation angle of the lighting means on the basis of the vehicle speed detected by the vehicle speed detecting means and the transverse acceleration detected by the acceleration detecting means; radiation angle control means for controlling a present position of the radiation angle of the lighting means so as to coincide with the target position obtained by the target position operating means; curved road end detecting means for detecting an end of the curved road on the basis of a difference between detection values of the transverse acceleration, detected at a current time and at a previous time, respectively, by the acceleration detecting means; and target position changing means for changing the target position of the radiation angle obtained by the target position operating means so that the target position is decreased, at a predetermined rate, in a direction so as to change as a steering wheel is returned to a neutral position when an end of the curved road is detected by the curved road end detecting means.

Therefore, according to the first embodiment, the target position of the radiation angle is obtained on the basis of the vehicle speed and the rotation angular velocity. While the present position of the radiation angle is controlled to coincide with this target position, the target position of the radiation angle is reduced at a predetermined rate in a direction so as to change as the steering wheel is returned to a neutral position when the end of a curved road is detected, so that the present position of the radiation angle is controlled to coincide with this target position.

In addition, in the second embodiment, the target position of the radiation angle is obtained on the basis of the vehicle speed and the transverse acceleration. While the present position of the radiation angle is controlled to coincide with this target position, the target position of the radiation angle is reduced at a predetermined rate in a direction so as to change as the steering wheel is returned to a neutral position when the end of a curved road is detected, so that the present position of the radiation angle is controlled to coincide with this target position.

BRIEF DESCRIPTION OF THE DRAWINGS

FIG. 1 is a flow chart explaining the processing operations of a microcomputer shown in FIG. 5;

FIGS. 2a and 2b are diagrams explaining the relationship between radius r and speed v to an angular velocity ω, and the relationship to a transverse acceleration a;

DETAILED DESCRIPTION OF THE PREFERRED EMBODIMENTS

The general principles of the present invention will now be described before the description of the first and second preferred embodiments.

Figure 2A:
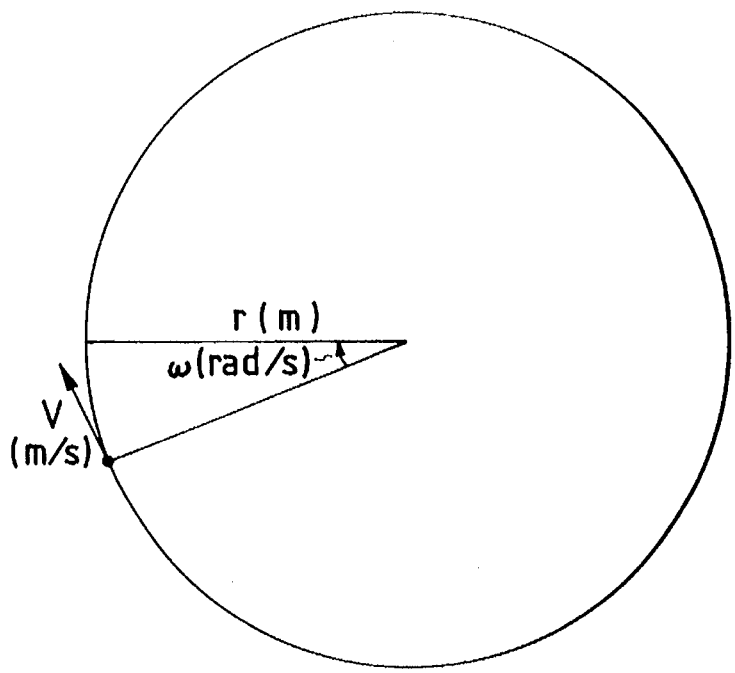

Provided the rotation angular velocity of a body moving along a circular path of radius r (m), at a speed v (m/s), is ω (rad/s) (with reference to FIG. 2(a)), the following equation of motion applies.

$$r = v/\omega \ (m)$$

rad is dimensionless.

Figure 2B:
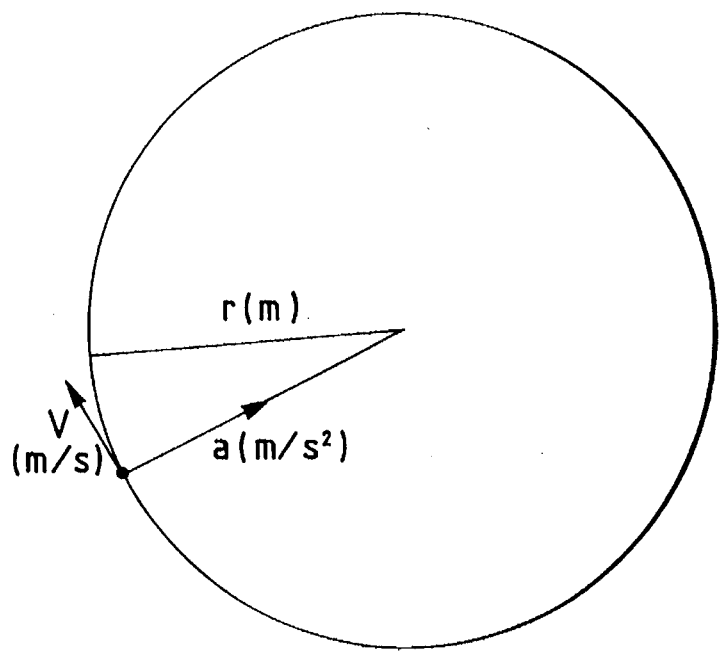

Taking the transverse acceleration of a body moving along a circular path of radius r (m), at a speed v (m/s), as a (m/s$^2$) (with reference to FIG. 2(b)), the following equation of motion is established.

$$r = v^2/a \ (m)$$

Next, the correspondence between the radius of the path of motion and the radiation angle of a headlamp is obtained.

Figure 3:
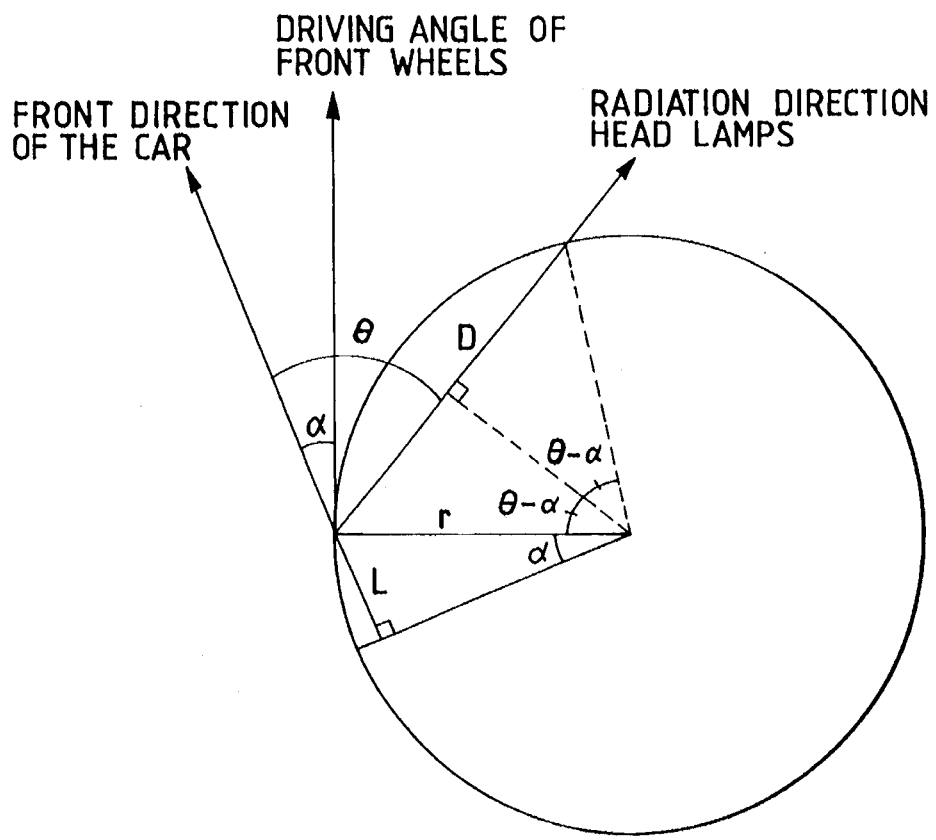
FIG. 3 is a diagram explaining the correspondence between a revolution radius r and a radiation angle θ of a headlamp.

Taking the revolution radius as r, the radiation angle as θ, the wheel base of the car as L, and the driving angle of front wheels as α (with reference to FIG. 3), the radiation distance D of the headlamp can be expressed as:

$$D = 2r \cdot \sin(\theta - \alpha) \tag{I}$$

providing $$L = r \cdot \sin \alpha \tag{II}$$

Here, the radiation distance D is defined as the intersection between a locus (circle) where the car is going to pass and a main optical axis of the headlamp.

It is desirable for a driver that the radiation angle θ is controlled to always keep the radiation distance D constant regardless of the revolution radius r. Therefore, D is made to be a constant.

When r>>L, the expression (I) can be approximated by:

$$D \approx 2r \cdot \sin \theta \tag{III}$$

Figure 4:
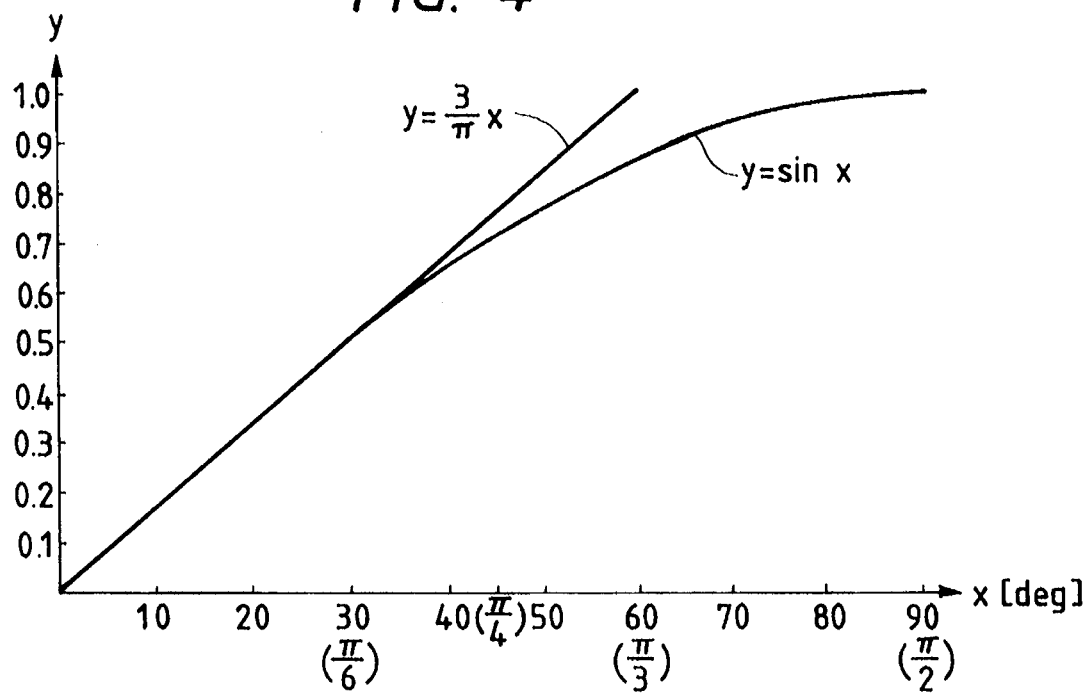
FIG. 4 is a straight-line approximation diagram of a trigonometric function.

Further, when $0 \leq \theta \leq \pi/6$, it can be approximated by (with reference to FIG. 4):

$$\sin \theta \approx 3\theta/\pi \tag{IV}$$

Substituting expression (IV) into expression (III), θ can be obtained as:

$$\theta \approx \pi D/6r \tag{V}$$

In expression (V), π is a constant, and D is also a constant, as noted above. Therefore, when πD/6r=K (constant) is substituted into expression (V), expression (V) becomes:

$$\theta \approx K/r \tag{VI}$$

From expression (VI), the radiation angle θ can be approximated as a simple inverse function of the revolution radius r.

The present invention is based on the above-described analysis, and will now be described with reference to the first and second embodiments.

Figure 5:
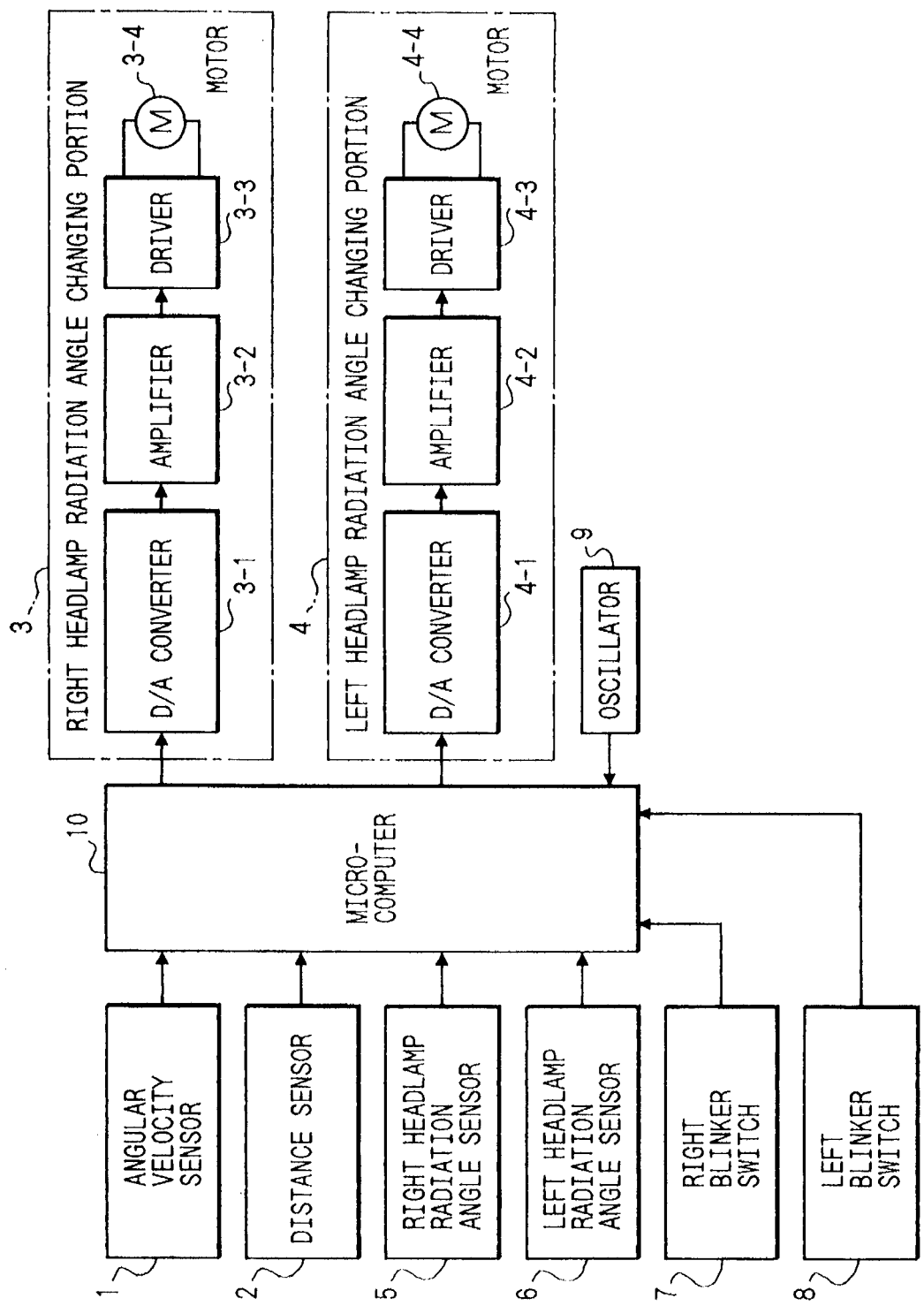
FIG. 5 is a block diagram illustrating a preferred embodiment of the present invention.

FIG. 5 is a block diagram illustrating a first embodiment of the present invention. In FIG. 5, reference numeral 1 represents an angular velocity sensor (for example, a regular triangle pole piezoelectric vibration gyroscope) disposed inside a vehicle; 2, a well-known distance sensor generating a pulse (distance pulse) every time the vehicle travels a predetermined distance; 3, a right headlamp radiation angle changing portion for changing the radiation angle of a headlamp (not shown) disposed on the right side of the vehicle; 4, a left headlamp radiation angle changing portion for changing the radiation angle of a headlamp (not shown) disposed on the left side of the vehicle; 5, a right headlamp radiation angle sensor for detecting the present position of the radiation angle of the right headlamp; 6, a left headlamp radiation angle sensor for detecting the present position of the radiation angle of the left headlamp; 7, a right blinker switch turning on interlocking with the operation of a blinker provided on the right side of the vehicle; 8, a left blinker switch turning on interlocking with the operation of a blinker provided on the left side of the vehicle; 9, an oscillator; and 10, a microcomputer.

Figure 6:
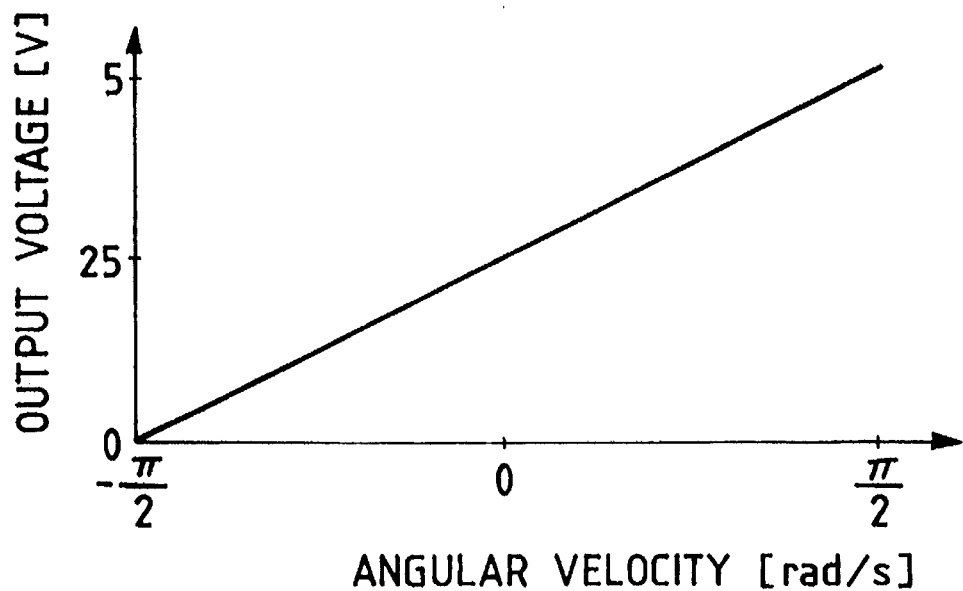
FIG. 6 is an angular-velocity to output-voltage characteristic diagram of an angular velocity sensor 1.

The right headlamp radiation angle changing portion 3 has a D/A converter 3-1, an amplifier 3-2, a driver 3-3 and a motor 3-4. The radiation angle of the right headlamp is changed in accordance with the rotation of the motor 3-4. The left headlamp radiation angle changing portion 4 has a D/A converter 4-1, an amplifier 4-2, a driver 4-3 and a motor 4-4. The radiation angle of the left headlamp is changed in accordance with the rotation of the motor 4-4. The angular velocity sensor 1 has an angular-velocity v. output-voltage characteristic which is shown in FIG. 6.

Next, the operation of this cornering lamp system will be described with reference to the flow chart shown in FIG. 1.

When a vehicle is travelling on a curved road, the angular velocity sensor 1, shown in FIG. 5, generates a voltage corresponding to the angular velocity at that time. The microcomputer 10 receives the voltage from the angular velocity sensor 1 as its input, and calculates a detection value $\omega_{new}$ of the angular velocity (Step 101). The microcomputer 10 measures the vehicle speed on the basis of distance pulses from the distance sensor 2 (Step 102), and establishes this measured vehicle speed as v (Step 103).

Figure 7:
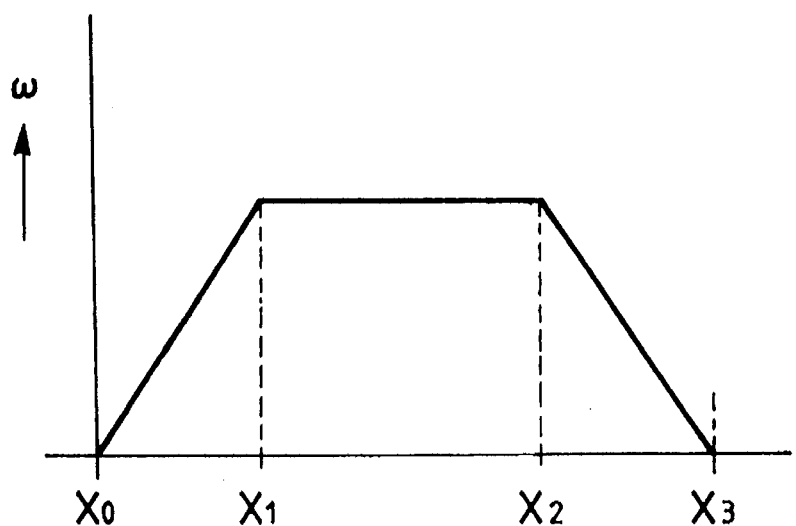
FIG. 7 is a diagram illustrating the change in angular velocity ω on a curved road.

If the vehicle speed v is at least 10 km/h, the microcomputer 10 advances to Step 108, in response to the NO indication in Step 104, and detects an end of the curved road on the basis of the difference between a detection value $\omega_{old}$ of the angular velocity detected immediately previously and the detection value $\omega_{new}$ of the angular velocity detected at the current time. Specifically, as shown in FIG. 7, the angular velocity $\omega$ increases from the time $X_0$ when the vehicle begins to enter the curved road. On the curved road ($X_1$ to $X_2$), the angular velocity $\omega$ remains approximately constant. When the vehicle begins to exit from the curved road, that is, at the time $X_2$, the angular velocity $\omega$ begins to decrease. Thus, the end of the curved road can be said to end at the time when that angular velocity $\omega$ begins to decrease. Therefore, in this embodiment, by examining the difference between $\omega_{old}$ and $\omega_{new}$, it can be determined when the curved road has come to an end by recognizing the time when the gradient of the angular velocity $\omega$ changes in the direction of zero. In order to improve the accuracy with which the end of the curved road can be detected, it is preferably judged that there is an end of the curved road at the time when the change of the gradient of the angular velocity $\omega$ into the direction of zero is confirmed, for example, after ten continuous times (detection cycles).

If an end of the curved road is not detected in Step 109 on the basis of the determination made in Step 108, the microcomputer 10 advances to Step 110 in response to the NO output in Step 109. The microcomputer 10 then divides the angular velocity $\omega_{new}$ by the vehicle velocity v, to calculate the reciprocal number of the revolution radius r, and multiplies this reciprocal number of the revolution radius r by the constant K, so as to obtain a target value θs of the radiation angle. That is, the microcomputer 10 performs the substantial operations of dividing the angular velocity $\omega_{new}$ by the vehicle velocity v, to calculate the revolution radius r ($r=v/\omega_{new}$), and then multiplies the reciprocal number (1/r) of the revolution radius r by the constant K.

The microcomputer 10 receives present values $\theta r_R$ and $\theta r_L$, of the radiation angles from the right headlamp radiation angle sensor 5 and the left headlamp radiation angle sensor 6, respectively (Step 111). The microcomputer 10 then multiplies the difference between θs and $\theta r_R$ by a coefficient a to calculate the variable quantity $m_R$ of the radiation angle of the right headlamp, and multiplies the difference between θs and $\theta r_L$ by a coefficient a to calculate the variable quantity $m_L$ of the radiation angle of the left headlamp (Step 112). Then, the microcomputer 10 supplies driving signals corresponding to the obtained variable quantities $m_R$ and $m_L$ to the right headlamp radiation angle changing portion 3 and the left headlamp radiation angle changing portion 4 (Step 113), so that the motors 3-4 and 4-4 are driven and rotated to control $\theta r_R$ and $\theta r_{L,respectively}$, to coincide with target value θs.

If the end of the curved road is detected in Step 109 on the basis of the determination made in Step 108, the microcomputer 10 advances to Step 114 in response to the YES response in Step 109. The microcomputer 10 then divides the angular velocity $\omega_{new}$, by the vehicle velocity v, to calculate the reciprocal number of the revolution radius r, multiplies this reciprocal number of the revolution radius r by the constant K, and by ½, so as to obtain a target value θs of the radiation angle. Consequently, the target value θs obtained in Step 114 is half the target value θs obtained in Step 110, so that at the end of the curved road the radiation angles of the right and left headlamps are returned twice as when the end of the curved road is not detected. Accordingly, when the vehicle exits the curved road, the radiation angles can follow the rapid return of driver's eyes to a straight road.

On the other hand, if the microcomputer 10 determines that v≦10 km/h in Step 104, the microcomputer 10 fixes v to 10 km/h in Step 105. In this case, if the left and right blinkers are not being operated, the microcomputer 10 advances to Step 108 et seq. in response to NO determinations in both Steps 106 and 107. As noted above, if v is ≦10 km/h, the microcomputer 10 sets v to 10 km/h, regardless of the vehicle speed detected at that time, obtains a target value θs of the radiation angle, and controls $\theta r_R$ and $\theta r_L$ to coincide with this target value θs. Consequently, if the detected vehicle speed is not more than 10 km/h, that is, in a low vehicle speed area where there is a problem in accuracy, the vehicle speed is set as 10 km/h in the microcomputer 10, and the target value θs is obtained from the angular velocity $\omega_{new}$, at that time and v=10 km/h, so that a sufficient visual field in the travel direction can be secured even in the case of a low speed vehicle.

If in Step 106 the microcomputer 10 determines that the left blinker switch 8 is turned on, the microcomputer 10 sets the target value θs of the radiation angle to the maximum leftward displacement (Step 115), and performs processing in and after Step 111. Consequently, the radiation angles $\theta r_R$ and $\theta r_L$ of the right and left headlamps are fixed after being changed to their maximum leftward positions. If the microcomputer 10 determines in Step 107 that the right blinker switch 7 is turned on, the microcomputer 10 sets the target value θs of the radiation angle to the maximum rightward displacement (Step 116), and performs processing in and after Step 111. Consequently, the radiation angles $\theta r_R$ and $\theta r_L$ of the right and left headlamps are fixed after being changed to their maximum rightward positions. That is, in this embodiment, in the case where the vehicle intends to turn to the right (or to the left) after stopping at an intersection point or the like, only if the right blinker (or left blinker) is operated, the radiation angle of the right headlamp (or left headlamp) is fixed after being moved to its maximum rightward position (or into its maximum leftward position), so that a visual field in the travel direction can be assured, and at the same time when an operator makes right or lefthand turns, the headlamps are not excessively shifted in position.

Figure 8:
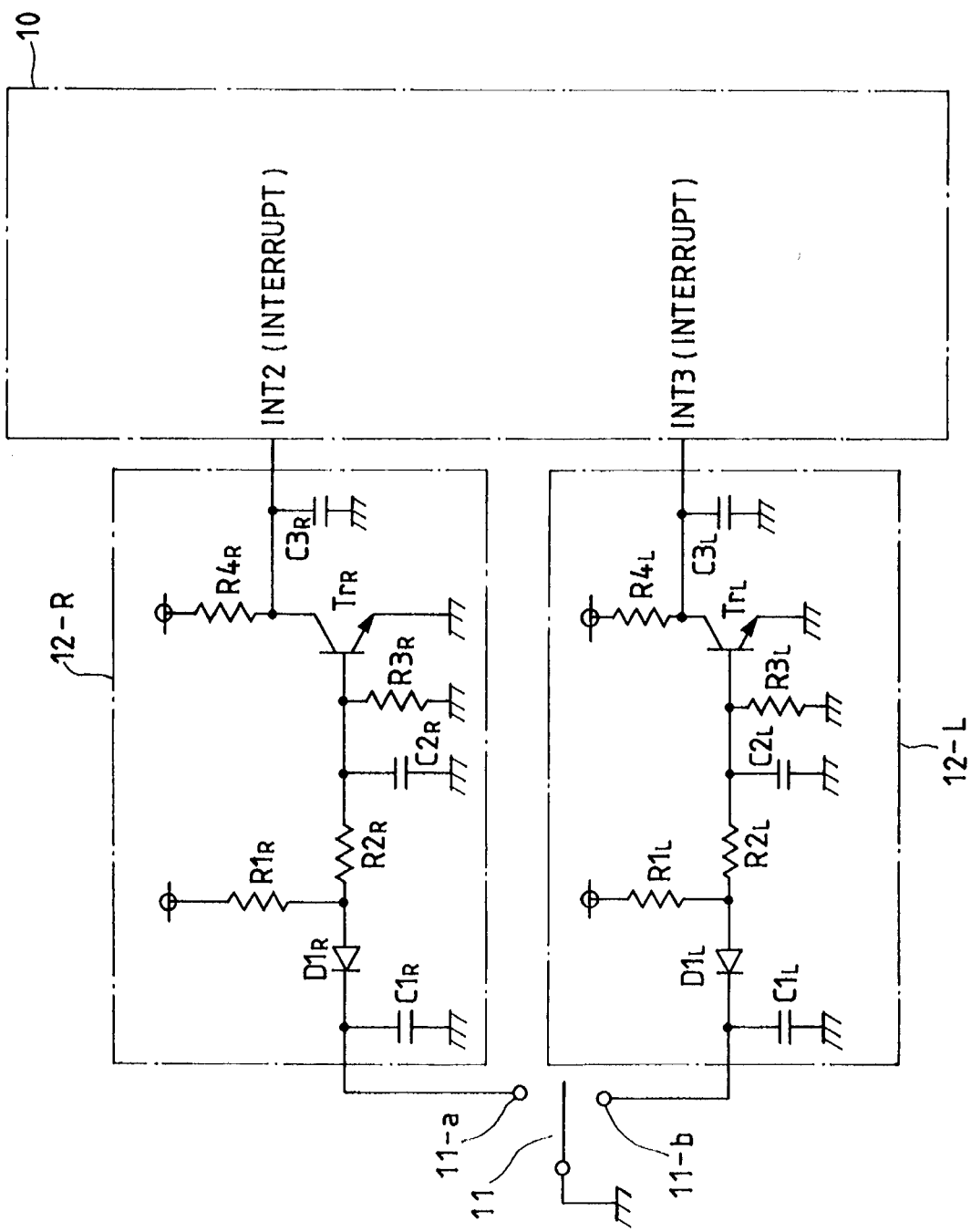
FIG. 8 is a diagram illustrating a circuit in which a changeover switch is used as blinker switches, and chattering prevention circuits are provided between the changeover switch and a microcomputer.

Although the right and left blinker switches, 7 and 8 respectively, are provided separately in this embodiment, a changeover switch 11 as shown in FIG. 8 may be used as a common blinker switch for both the left and right blinkers. In addition, in order to avoid the occurrence of chattering, chattering prevention circuits may be provided between the right and left blinker switches 7 and 8 and the microcomputer 10.

According to FIG. 8, chattering prevention circuits 12-R and 12-L are provided between a blinker switch 11 and a microcomputer 10. In this example circuit, if a right blinker is operated to turn on the contact point 11-a side of the blinker switch 11, charges stored in a capacitor $C2_R$ are gradually reduced, so that a transistor $Tr_R$ is turned off at a later predetermined time. Accordingly, even if the contact point 11-a of the blinker switch 11 is repeatedly turned on and off within a short time, chattering does not occur in the operation of changing the radiation angle. The same operation is also performed when a left blinker is operated to turn on the contact point 11-*b* side of the blinker switch 11.

Although the angular velocity sensor 1 is used in the first embodiment, an acceleration sensor may also be used, as noted above in the second embodiment. That is, transverse acceleration may be detected, by use of an acceleration sensor, and supplied to the microcomputer 10. In this case, the microcomputer 10 squares the vehicle speed v, divides $v^2$ by the transverse acceleration to obtain the revolution radius r, and multiplies the reciprocal number of this revolution radius r by the constant K, so as to obtain a target value θs of the radiation angle.

As is apparent from the above description, according to the present invention, a target position of a radiation angle is obtained on the basis of vehicle speed and rotation angular velocity, and the present position of the radiation angle is controlled to coincide with this target position. In addition, if an end of a curved road is detected, the target position of the radiation angle is reduced at a predetermined rate in the direction so as to change as the steering wheel is returned to its neutral position, and the present position of the radiation angle is controlled to coincide with this target position. Accordingly, the same system structure can be applied to any type of vehicle without changing the correspondence to the radiation angle, and the radiation angle can follow the return of driver's eyes when the vehicle returns from the curved road back to a straight road.

What is claimed is:

1. A vehicle cornering lamp system for changing a radiation angle of a lighting means when a vehicle travels on a curved road at a speed, comprising:

angular velocity detecting means for detecting a rotation angular velocity when the vehicle travels on the curved road;

vehicle speed detecting means for detecting the vehicle speed of the vehicle;

target position operating means for obtaining a target position of a radiation angle of the lighting means based on the vehicle speed detected by said vehicle speed detecting means and the rotation angular velocity detected by said angular velocity detecting means;

radiation angle control means for controlling a current position of the radiation angle of the lighting means so as to coincide with the target position obtained by said target position obtained by said target position operating means;

curved road end detecting means for detecting an end of the curved road based on a difference between the rotation angular velocity detected at a current time and that detected at a previous time by said angular velocity detecting means; and target position changing means for changing the target position of the radiation angle obtained by said target position operating means so that the target position is decreased at a predetermined rate in a direction so as to change when an end of the curved road is detected by said curved road end detecting means.

2. A vehicle cornering lamp system for changing a radiation angle of a lighting means when a vehicle travels on a curved road at a speed, comprising:

acceleration detecting means for detecting a transverse acceleration when the vehicle travels on the curved road;

vehicle speed detecting means for detecting the speed of the vehicle;

target position operating means for obtaining a target position of a radiation angle of the lighting means based on the vehicle speed detected by said vehicle speed detecting means and the transverse acceleration detected by said acceleration detecting means;

radiation angle control means for controlling a current position of the radiation angle of the lighting means so as to coincide with the target position obtained by said target position operating means;

curved road end detecting means for detecting an end of the curved road based on a difference between the transverse acceleration detected at a current time and detected at a previous time by said acceleration detecting means; and target position changing means for changing the target position of the radiation angle obtained by said target position operating means so that the target position is decreased at a predetermined rate in the direction so as to change when an end of the curved road is detected by said curved road end detecting means.

* * * * *

UNITED STATES PATENT AND TRADEMARK OFFICE
CERTIFICATE OF CORRECTION

PATENT NO. : 5,526,242

DATED : June 11, 1996

INVENTORS : KAZUKI TAKAHASHI ET AL.

It is certified that error appears in the above-identified patent and that said Letters Patent is hereby corrected as shown below:

SHEET 1 of 6

Figure 1  "VELOSITY)" should read --VELOCITY--.

COLUMN 2

Line 23, "us" should read --is--.

COLUMN 5

Line 59, "$_{respectively,}$" should read --respectively,--.

COLUMN 6

Line 18, "$\theta_{rR}$ and $\theta_{rL}$" should read --$\theta r_R$ and $\theta r_L$--.

UNITED STATES PATENT AND TRADEMARK OFFICE
CERTIFICATE OF CORRECTION

PATENT NO. : 5,526,242

DATED : June 11, 1996

INVENTORS : KAZUKI TAKAHASHI ET AL.

It is certified that error appears in the above-identified patent and that said Letters Patent is hereby corrected as shown below:

<u>COLUMN 8</u>

Line 2, "obtained by said target position" should be deleted.

Signed and Sealed this

Thirty-first Day of December, 1996

Attest:

BRUCE LEHMAN

*Attesting Officer*  *Commissioner of Patents and Trademarks*